United States Patent
Zhu et al.

(10) Patent No.: US 12,543,327 B2
(45) Date of Patent: Feb. 3, 2026

(54) ON-CHIP ALL-SOLID-STATE SUPERCAPACITOR AND PREPARATION METHOD THEREOF

(71) Applicant: SHANGHAI INTEGRATED CIRCUIT MANUFACTURING INNOVATION CENTER CO., LTD, Shanghai (CN)

(72) Inventors: Bao Zhu, Shanghai (CN); Rui Yin, Shanghai (CN); Wei Zhang, Shanghai (CN)

(73) Assignee: SHANGHAI INTEGRATED CIRCUIT MANUFACTURING INNOVATION CENTER CO., LTD, Shanghai (CN)

( * ) Notice: Subject to any disclaimer, the term of this patent is extended or adjusted under 35 U.S.C. 154(b) by 850 days.

(21) Appl. No.: 17/564,762

(22) Filed: Dec. 29, 2021

(65) Prior Publication Data
US 2023/0021106 A1    Jan. 19, 2023

(30) Foreign Application Priority Data
Jul. 19, 2021   (CN) .......................... 202110815074.0

(51) Int. Cl.
  *H10D 1/00*     (2025.01)
  *H01G 11/26*    (2013.01)
  (Continued)

(52) U.S. Cl.
  CPC ............ *H10D 1/047* (2025.01); *H01G 11/26* (2013.01); *H01G 11/56* (2013.01); *H01G 11/86* (2013.01)

(58) Field of Classification Search
  CPC .. H01L 29/66181; H01G 11/26; H01G 11/56; H01G 11/86; H01G 11/84; H01G 4/30; H01G 4/304; H01G 4/385; Y02E 60/13
  See application file for complete search history.

(56) References Cited

U.S. PATENT DOCUMENTS

2014/0138829 A1* 5/2014 Zhao ................... H01L 21/7682
                                                                257/746

FOREIGN PATENT DOCUMENTS

| CN | 108538821 A | * | 9/2018 | ............. H01G 11/00 |
| CN | 109755254 A | * | 5/2019 | |
| KR | 100732282 B1 | * | 6/2007 | ............. H10D 1/716 |

* cited by examiner

*Primary Examiner* — Kretelia Graham
*Assistant Examiner* — Jaesun Lee
(74) *Attorney, Agent, or Firm* — Ziegler IP Law Group, LLC.

(57) ABSTRACT

An on-chip all-solid-state supercapacitor includes first electrode and second electrode, each including substrate, laminated structure, conductive thin film layer and solid electrolyte. Laminated structure is disposed on surface of substrate and has at least one deep trench structure; inner surface of deep trench structure has sacrificial layer trench to increase electrode area of on-chip all-solid-state supercapacitor capacitance density and energy density; conductive thin film layer covers inner surface of deep trench structure, inner surface of sacrificial layer trench, surface of substrate exposed in deep trench structure and surface of laminated structure facing away from substrate; solid electrolyte is filled inside sacrificial layer trench and deep trench structure covered by conductive thin film layer; solid electrolyte also covers surface of conductive thin film layer facing away from substrate, solid electrolyte of first electrode and solid electrolyte of second electrode are bonded together. A preparation method thereof is also provided.

3 Claims, 4 Drawing Sheets

(51) Int. Cl.
*H01G 11/56* (2013.01)
*H01G 11/86* (2013.01)

ON-CHIP ALL-SOLID-STATE SUPERCAPACITOR AND PREPARATION METHOD THEREOF

FIELD OF TECHNOLOGY

The present invention relates to the technical field of semiconductors, in particular to an on-chip all-solid-state supercapacitor and a preparation method thereof.

BACKGROUND

With the rapid development of wireless charging and Internet of Things, chips are required to enable energy autonomy. In the electronic devices used for energy storage, supercapacitors have attracted wide attention because of their high power density and cycle life. Supercapacitors can store energy through electric double-layer (electric double-layer capacitors) or near-surface redox reaction (pseudocapacitors). In general, the energy density of pseudocapacitors are much greater than that of electric double-layer capacitors. In order to integrate with silicon-based chips, supercapacitors need to be fabricated directly on the chips. Secondly, the use of solid electrolyte is the best choice because additional packaging is needed to prevent the leakage of liquid electrolyte. In other words, all-solid-state supercapacitors are better suited for integration with silicon-based chips. In order to make full use of silicon materials, the structure of silicon substrate can be designed and used as electrode materials directly. Based on this idea, a large number of silicon-based nanostructures have been used as templates for preparing supercapacitors. However, since silicon is easily oxidized and the oxidation is irreversible, a passivation layer, such as graphene, carbon, or titanium nitride, is usually coated on the surface of silicon. However, these supercapacitors use a single silicon deep trench or nanowire structure, so the available energy density is relatively small.

Therefore, it is necessary to provide a novel on-chip all-solid-state supercapacitor and a preparation method thereof to solve the above problems in the prior art.

SUMMARY

The purpose of the present invention is to provide an on-chip all-solid-state supercapacitor and a preparation method thereof, which increases the electrode area, thereby increasing the capacitance density and the energy density.

To achieve the above purpose, the on-chip all-solid-state supercapacitor of the present invention includes a first electrode and a second electrode with a same structure and disposed symmetrically and both the first electrode and the second electrode include a substrate, a laminated structure, a conductive thin film layer and a solid electrolyte, the laminated structure disposed on a surface of the substrate and provided with at least one deep trench structure connecting with the substrate, an inner surface of the deep trench structure provided with a sacrificial layer trench, an inner surface of the sacrificial layer trench being in contact with an inner surface of the deep trench structure to form a continuous inner surface, the conductive thin film layer covering the inner surface of the deep trench structure, the inner surface of the sacrificial layer trench, the surface of the substrate exposed in the deep trench structure and a surface of the laminated structure facing away from the substrate, the solid electrolyte filled inside the sacrificial layer trench and the deep trench structure, the solid electrolyte also covering a surface of the conductive thin film layer facing away from the substrate and the solid electrolyte of the first electrode and the second electrode glued together.

The beneficial effects of the on-chip all-solid-state supercapacitor are that the laminated structure is disposed on the surface of the substrate and the laminated structure is provided with at least one deep trench structure connecting with the substrate, the inner surface of the deep trench structure is provided with a sacrificial layer trench, and the inner surface of the sacrificial layer trench is in contact with the inner surface of the deep trench structure to form a continuous inner surface, thereby increasing the electrode area of the on-chip all-solid supercapacitor, and thus increasing the capacitance density and the energy density.

Preferably, the substrate is provided with a substrate trench structure corresponding to the deep trench structure, and an inner surface of the substrate trench structure is in contact with the inner surface of the deep trench structure to form a continuous inner surface. It has the beneficial effect that the electrode area of the on-chip all-solid-state supercapacitor is further increased, and the capacitor density and energy density are further increased.

Preferably, the laminated structure includes a silicon dioxide layer and a sacrificial layer alternatively disposed, the number of layers of the silicon dioxide layer is at least 2 and the number of layers of the sacrificial layer is at least 1. It has the beneficial effect that it facilitates a formation of a plurality of sacrificial layer trenches, thereby increasing the electrode area of the on-chip all-solid-state supercapacitor, and thus increasing the capacitor density and the energy density.

Further preferably, a material of the sacrificial layer is any one of silicon nitride, germanium oxide or amorphous carbon. It has the beneficial effect that the sacrificial layer is easy to be etched by a traditional process, the process is simple and the cost is low.

Preferably, the substrate is any one of silicon substrate, germanium substrate, silicon germanium substrate, gallium arsenide substrate, gallium antimonide substrate, aluminum arsenide substrate, indium arsenide substrate, indium phosphide substrate, gallium nitride substrate, silicon carbide substrate, indium gallium arsenic substrate, indium antimonide substrate, and indium gallium antimony substrate.

Preferably, a material of the conductive thin film layer is any one of titanium nitride, tantalum nitride, zirconium nitride, ruthenium, cobalt and platinum.

Preferably, a material of the solid electrolyte is any one of a gel formed by mixing polyvinyl alcohol and potassium hydroxide or a gel formed by mixing polyvinyl alcohol and sulfuric acid.

The present invention also provides a preparation method of an on-chip all-solid-state supercapacitor, which includes the following steps:

S1: growing a laminated layer on a substrate;
S2: etching the laminated layer until the substrate is exposed to form a deep trench structure;
S3: etching an inner wall of the deep trench structure to form a sacrificial layer trench so that the laminated layer forms a laminated structure;
S4: growing a conductive thin film layer on a surface of the exposed substrate, an inner surface of the deep trench structure, an inner surface of the sacrificial layer trench and a surface of the laminated structure facing away from the substrate;
S5: filling a solid electrolyte into the deep trench structure and the sacrificial layer trench covered by the conductive thin film layer, and making the solid electrolyte to cover the surface of the conductive thin film layer facing away from the substrate to form a first electrode;

S6: executing the steps S1 to S5 repeatedly to form a second electrode; and

S7: bonding the first electrode and the second electrode together symmetrically and drying to form the on-chip all-solid supercapacitor, wherein the solid electrolyte of the first electrode and the second electrode are glued together.

The preparation method of the on-chip all-solid-state supercapacitor has the beneficial effects that the laminated layer is etched until the substrate is exposed to form the deep trench structure, and the inner wall of the deep trench structure is etched to form the sacrificial layer trench, so that the laminated layer forms a laminated structure, which can increase the electrode area of the on-chip all-solid-state supercapacitor, and further increases the capacitance density and energy density.

Preferably, growing a laminated layer on a substrate includes alternately growing a silicon dioxide layer and a sacrificial layer on the substrate, wherein the number of layers of the silicon dioxide layer is at least 2 and the number of layers of the sacrificial layer is at least 1. It has the beneficial effect that it facilitates a formation of a plurality of sacrificial layer trenches, thereby increasing the electrode area of the on-chip all-solid-state supercapacitor, and thus increasing the capacitor density and the energy density.

Preferably, the step S2 further includes etching the substrate to form a substrate trench structure after the deep trench structure is formed, wherein an inner surface of the substrate trench structure is in contact with the inner surface of the deep trench structure to form a continuous inner surface. It has the beneficial effect that the electrode area of the on-chip all-solid-state supercapacitor is further increased, and the capacitor density and energy density are further increased.

Further preferably, etching an inner wall of the deep trench structure to form a sacrificial layer trench includes etching a portion of the sacrificial layer to form the sacrificial layer trench.

Preferably, the step S5 further includes mixing the polyvinyl alcohol and potassium hydroxide to form the solid electrolyte, or mixing the polyvinyl alcohol and sulfuric acid to form the solid electrolyte.

DESCRIPTION OF THE EMBODIMENTS

Figure 1:
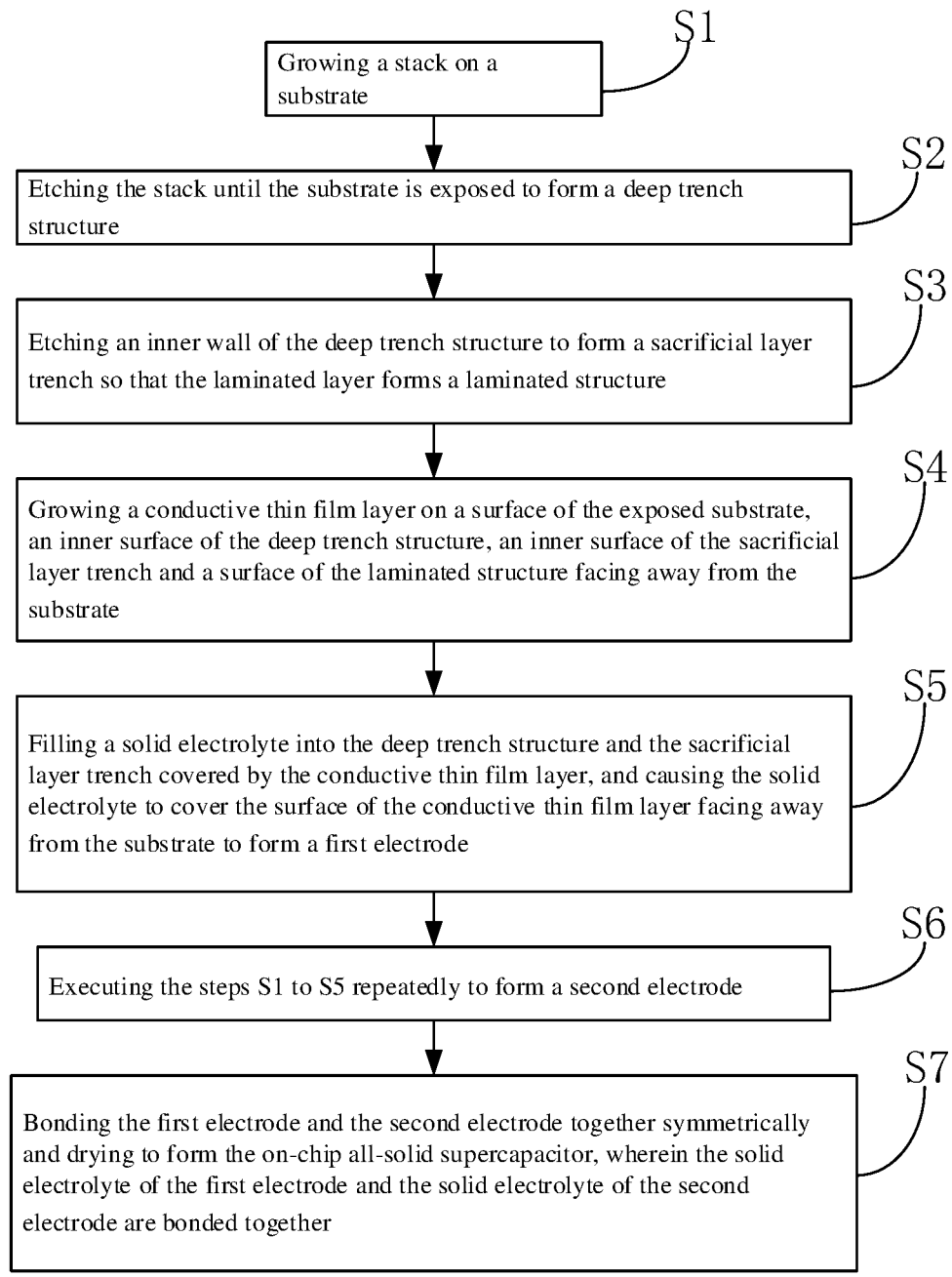
FIG. 1 is a flowchart of a preparation method of an on-chip all-solid-state supercapacitor of the present invention.

In order to make objectives, technical solutions, and advantages of the present invention clearer, the technical solutions in the present invention are described clearly and completely in the following with reference to accompanying drawings in the embodiments of the present invention. Apparently, the described embodiments are only part rather than all of the embodiments of the present invention. Based on the embodiments of the present invention, all the other embodiments obtained by those of ordinary skill in the art without inventive effort are within the scope of the present invention. Unless otherwise mentioned, all technical and scientific terms used herein have the same meaning as commonly understood by one of ordinary skill in the art to which the present invention belongs. The term "including" and the like as used herein means that the elements or articles appearing before the term encompass the enumerated elements or articles appearing after the term and their equivalents, without excluding other elements or articles.

Regarding the problems in the prior art, embodiments of the present invention provide an on-chip all-solid-state supercapacitor, which includes a first electrode and a second electrode with a same structure and disposed symmetrically and both the first electrode and the second electrode include a substrate, a laminated structure, a conductive thin film layer and a solid electrolyte, the laminated structure disposed on a surface of the substrate and provided with at least one deep trench structure connecting with the substrate, an inner surface of the deep trench structure provided with a sacrificial layer trench, an inner surface of the sacrificial layer trench being in contact with an inner surface of the deep trench structure to form a continuous inner surface, the conductive thin film layer covering the inner surface of the deep trench structure, the inner surface of the sacrificial layer trench, the surface of the substrate exposed in the deep trench structure and a surface of the laminated structure facing away from the substrate, the solid electrolyte filled inside the sacrificial layer trench and the deep trench structure, the solid electrolyte also covering a surface of the conductive thin film layer facing away from the substrate and the solid electrolyte of the first electrode and the second electrode glued together.

In some preferred embodiments, the substrate is provided with a substrate trench structure corresponding to the deep trench structure, and an inner surface of the substrate trench structure is in contact with the inner surface of the deep trench structure to form a continuous inner surface, which further increases the electrode area of the on-chip all-solid supercapacitor, and further increases the capacitance density and energy density.

In some embodiments, the laminated structure includes a silicon dioxide layer and a sacrificial layer alternatively disposed, wherein the number of layers of the silicon dioxide layer is at least 2 and the number of layers of the sacrificial layer is at least 1, and the number of layers of the silicon dioxide layer is always one more than the number of layers of the sacrificial layer, which facilitates a formation of a plurality of sacrificial layer trenches, thereby increasing the electrode area of the on-chip all-solid-state supercapacitor, and further increasing the capacitance density and energy density.

In some embodiments, a material of the solid electrolyte is any one of a gel formed by mixing polyvinyl alcohol and potassium hydroxide or a gel formed by mixing polyvinyl alcohol and sulfuric acid.

Figure 2:
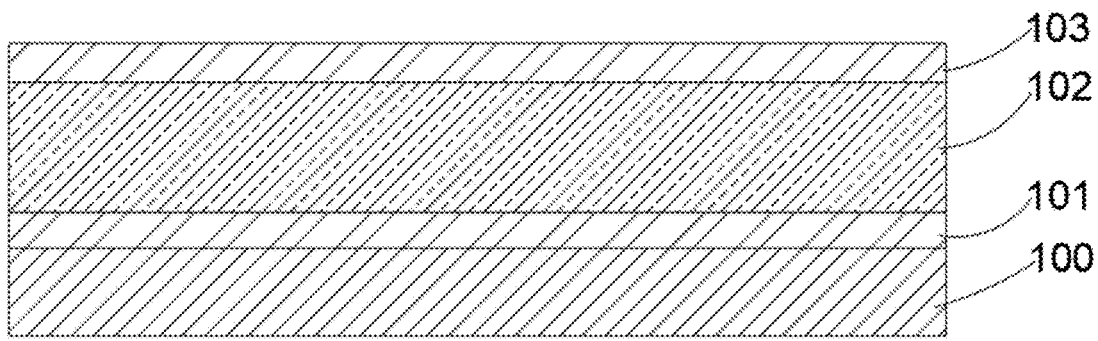
FIG. 2 is a structural schematic diagram after growing a laminated layer on a substrate.
Figure 3:
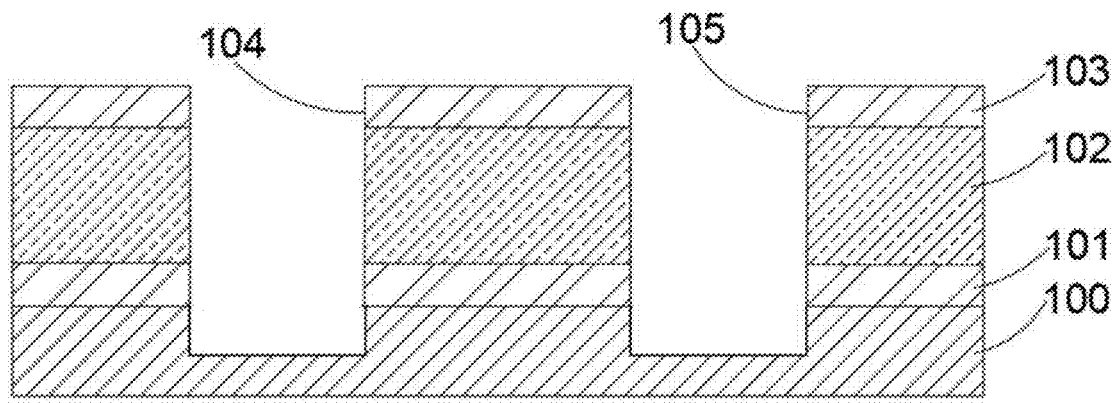
FIG. 3 is a structural schematic diagram after etching the structure shown in FIG. 2 to form a trench structure.
Figure 4:
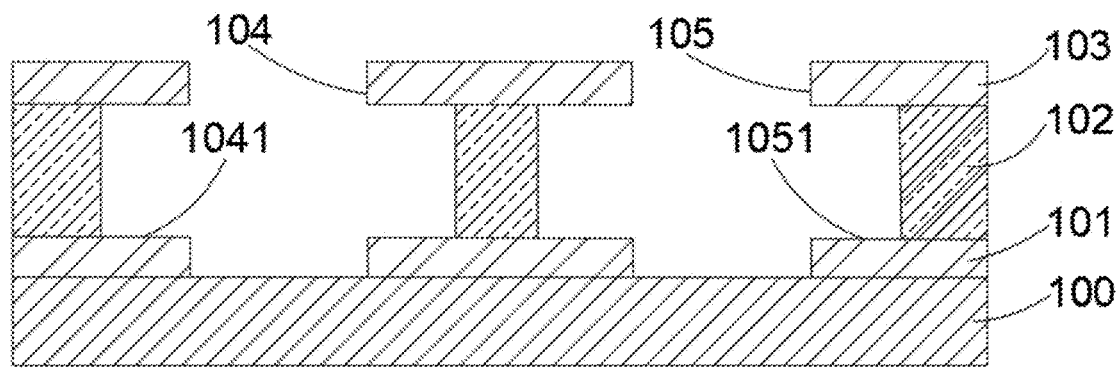
FIG. 4 is a schematic diagram of etching the structure shown in FIG. 3 to a laminated structure.
Figure 5:
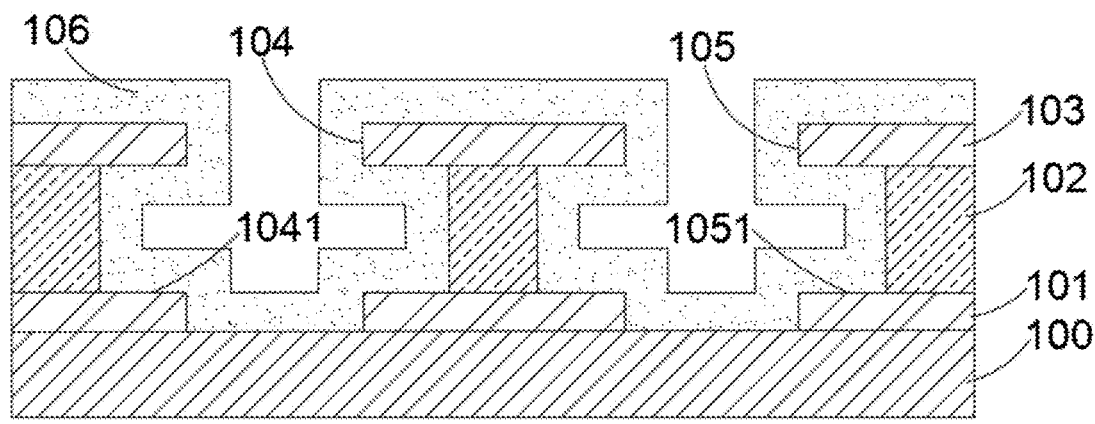
FIG. 5 is a structural schematic diagram after growing a conductive thin film layer on the structure shown in FIG. 4.
Figure 6:
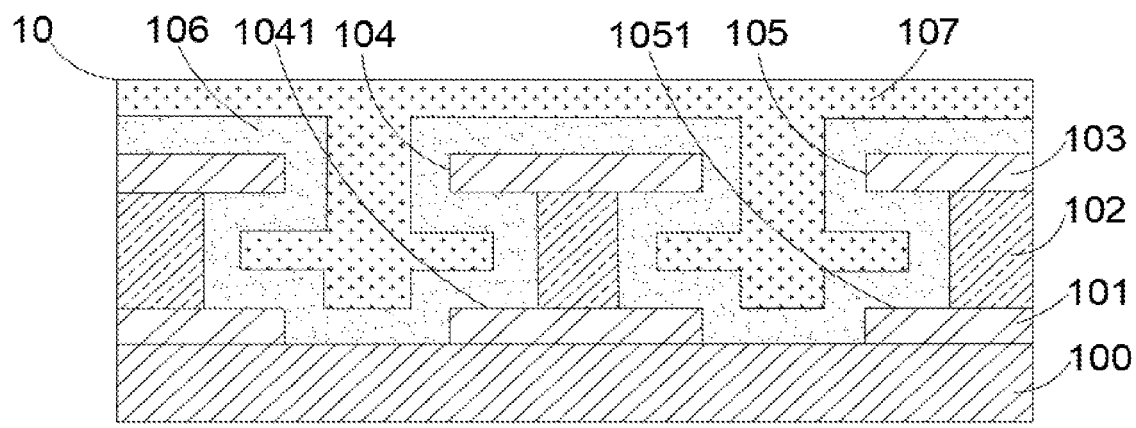
FIG. 6 is a structural schematic diagram after filling a solid electrolyte in the structure shown in FIG. 5.
Figure 7:
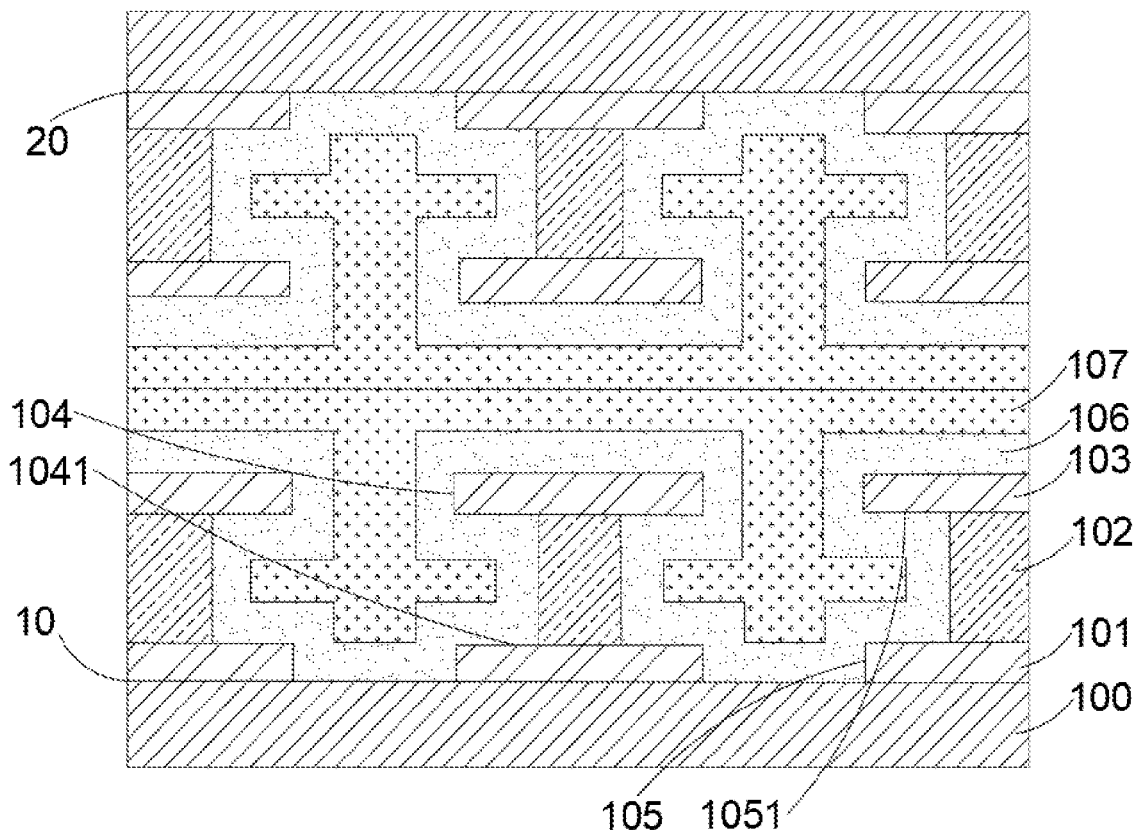
FIG. 7 is a structural schematic diagram of an on-chip all-solid-state supercapacitor.

FIG. 1 is a flowchart of a preparation method of an on-chip all-solid-state supercapacitor of the present invention. FIG. 2 is a structural schematic diagram after growing a laminated layer on a substrate. FIG. 3 is a schematic diagram of etching the structure shown in FIG. 2 to form a trench structure. FIG. 4 is a schematic diagram of etching the structure shown in FIG. 3 to a laminated structure. FIG. 5 is a structural schematic diagram after growing a conductive thin film layer on the structure shown in FIG. 4. FIG. 6 is a structural schematic diagram after filling a solid electrolyte in the structure shown in FIG. 5. FIG. 7 is a structural schematic diagram of an on-chip all-solid-state supercapacitor.

Referring to FIGS. 1-7, a preparation method of an on-chip all-solid-state supercapacitor includes the following steps:

S1: growing a laminated layer on a substrate.

In some embodiments, the substrate is any one of silicon (Si) substrate, germanium (Ge) substrate, silicon germanide (SiGe) substrate, gallium arsenide (GaAs) substrate, gallium antimonide (GaSb) substrate, aluminum arsenide (AlAs) substrate, indium arsenide (InAs) substrate, indium phosphide (InP) substrate, gallium nitride (GaN) substrate, silicon carbide (SiC) substrate, indium gallium arsenic (InGaAs) substrate, indium antimonide (InSb) substrate, and indium gallium antimony (InGaSb) substrate. Preferably, the substrate is a low resistance semiconductor substrate with a resistivity of 0.001 Ω·cm to 0.002 Ω·cm.

In some embodiments, growing a laminated layer on a substrate includes alternately growing a silicon dioxide layer and a sacrificial layer on the substrate, wherein the number of layers of the silicon dioxide layer is at least 2 and the number of layers of the sacrificial layer is at least 1, and the number of layers of the silicon dioxide layer is always one more than the number of layers of the sacrificial layer, which facilitates a formation of a plurality of sacrificial layer trenches, thereby increasing the electrode area of the on-chip all-solid-state supercapacitor, and further increasing the capacitance density and energy density. A material of the sacrificial layer is any one of silicon nitride (SiN), germanium oxide ($GeO_2$) or amorphous carbon.

Specifically, silicon dioxide is grown on a silicon substrate 100 as a first silicon dioxide layer 101 by chemical vapor deposition process, and then silicon nitride is grown on the silicon dioxide layer as a sacrificial layer 102, and then silicon dioxide is grown on the sacrificial layer as a second silicon dioxide layer 103, as show in FIG. 2, wherein the silicon substrate is a P-type silicon substrate with a resistivity of 0.001 Ω·cm, and is used as a current collector of the on-chip all-solid-state supercapacitor.

S2: etching the laminated layer until the substrate is exposed to form a deep trench structure.

Specifically, a layer of photoresist is coated on the second silicon dioxide layer 103; then a photolithographic pattern is formed by photolithography, and the first silicon dioxide layer 101, the sacrificial layer 102 and the second silicon dioxide layer 103 are etched by a deep reactive ion etching process using the photolithographic pattern as a mask to form a first deep trench structure 104 and a second deep trench structure 105, as shown in FIG. 3.

S3: etching an inner wall of the deep trench structure to form a sacrificial layer trench so that the laminated layer forms a laminated structure.

In some embodiments, etching an inner wall of the deep trench structure to form a sacrificial layer trench includes etching a portion of the sacrificial layer to form the sacrificial layer trench.

Specifically, portions of silicon nitride on sidewalls of the first deep trench structure 104 and portions of silicon nitride on sidewalls of the second deep trench structure 105 are wet-etched using hot phosphoric acid to form a first sacrificial layer trench 1041 and a second sacrificial layer trench 1051, respectively, as shown in FIG. 4.

S4: growing a conductive thin film layer on a surface of the exposed substrate, an inner surface of the deep trench structure, an inner surface of the sacrificial layer trench and a surface of the laminated structure facing away from the substrate.

In some embodiments, a material of the conductive thin film layer is any one of titanium nitride (TiN), tantalum nitride (TaN), zirconium nitride (ZrN), ruthenium (Ru), cobalt (Co), and platinum (Pt).

Specifically, anatomic deposition process is employed to grow a layer of titanium nitride thin film as a conductive thin film layer 106 on a surface of the exposed silicon substrate 100, an inner surface of the first deep trench structure 104, an inner surface of the first sacrificial layer trench 1041, an inner surface of the second deep trench structure 105, an inner surface of the second sacrificial layer trench 1051, and a surface of the laminated structure facing away from the silicon substrate. The surface of the laminated structure facing away from the silicon substrate is a surface of the second silicon dioxide layer 103 facing away from the silicon substrate.

S5: filling a solid electrolyte into the deep trench structure and the sacrificial layer trench, and making the solid electrolyte to cover the surface of the conductive thin film layer facing away from the substrate to form a first electrode.

In some embodiments, the step S5 further includes mixing the polyvinyl alcohol and potassium hydroxide to form the solid electrolyte, or mixing the polyvinyl alcohol and sulfuric acid to form the solid electrolyte.

Specifically, polyvinyl alcohol and potassium hydroxide are mixed to form a solid electrolyte 107; the solid electrolyte 107 is filled into the first deep trench structure 104, the first sacrificial layer trench 1041, the second deep trench structure 105 and the second sacrificial layer trench 1051 covered by the conductive thin film layer 106, and the solid electrolyte 107 covers a surface of the conductive thin film layer 106 facing away from the silicon substrate, to form a first electrode 10, as shown in FIG. 5.

S6: executing the steps S1 to S5 repeatedly to form a second electrode 20.

S7: bonding the first electrode 10 and the second electrode 20 together symmetrically and drying to form the on-chip all-solid supercapacitor, wherein the solid electrolyte of the first electrode 10 and the solid electrolyte of the second electrode 20 are glued together, as shown in FIG. 6.

In some preferred embodiments, the step S2 further includes etching the substrate to form a substrate trench structure after the deep trench structure is formed, wherein an inner surface of the substrate trench structure is in contact with the inner surface of the deep trench structure to form a continuous inner surface, which further increases the electrode area of the on-chip all-solid supercapacitor, and further increases the capacitance density and energy density, and in the step S4, a conductive thin film layer is grown on the inner surface of the exposed substrate trench structure, the inner surface of the deep trench structure, the inner surface of the sacrificial layer trench and the surface of the laminated structure facing away from the substrate.

While the embodiments of the present invention have been described in detail, it will be apparent to those skilled in the art that various modifications and changes can be made to the embodiments. However, it is to be understood that such modifications and variations are within the scope and spirit of the present invention as described in the appended claims. Furthermore, the present invention described herein is susceptible to other embodiments and may be embodied or carried out in various ways.

What is claimed is:

1. A preparation method of an on-chip all-solid-state supercapacitor, comprising:
   S1: growing a laminated layer on a substrate, including alternately growing a silicon dioxide layer and a sacrificial layer on the substrate, wherein the number of layers of the silicon dioxide layer is at least 2 and the number of layers of the sacrificial layer is at least 1; a material of the sacrificial layer is any one of silicon nitride, germanium oxide or amorphous carbon;
   S2: etching the laminated layer until the substrate is exposed to form a deep trench structure;
   S3: etching an inner wall of the deep trench structure to form a sacrificial layer trench so that the laminated layer forms a laminated structure;
   S4: growing a conductive thin film layer on a surface of the substrate being exposed, an inner surface of the deep trench structure, an inner surface of the sacrificial layer trench and a surface of the laminated structure facing away from the substrate;
   S5: filling a solid electrolyte into the deep trench structure and the sacrificial layer trench covered by the conductive thin film layer, and making the solid electrolyte to cover the surface of the conductive thin film layer facing away from the substrate to form a first electrode;
   S6: executing the steps S1 to S5 repeatedly to form a second electrode; and
   S7: bonding the first electrode and the second electrode together symmetrically and drying to form the on-chip all-solid supercapacitor, wherein the solid electrolyte of the first electrode and the second electrode are bonded together,
   wherein the step S2 further comprises etching the substrate to form a substrate trench structure after the deep trench structure is formed, wherein an inner surface of the substrate trench structure is in contact with the inner surface of the deep trench structure to form a continuous inner surface.

2. The preparation method according to claim 1, wherein etching an inner wall of the deep trench structure to form a sacrificial layer trench includes etching a portion of the sacrificial layer to form the sacrificial layer trench.

3. The preparation method according to claim 1, wherein the step S5 further comprises mixing polyvinyl alcohol and potassium hydroxide to form the solid electrolyte, or mixing polyvinyl alcohol and sulfuric acid to form the solid electrolyte.

* * * * *